United States Patent [19]

Swirhun et al.

[11] Patent Number: 5,631,988
[45] Date of Patent: May 20, 1997

[54] PARALLEL OPTICAL INTERCONNECT

[75] Inventors: Stanley E. Swirhun, Boulder; Toshi K. Uchida, Northglenn, both of Colo.

[73] Assignee: Vixel Corporation, Broomfield, Colo.

[21] Appl. No.: 667,367

[22] Filed: Jun. 21, 1996

Related U.S. Application Data

[60] Continuation of Ser. No. 392,251, Feb. 22, 1995, abandoned, which is a division of Ser. No. 66,757, May 24, 1993, Pat. No. 5,420,954.

[51] Int. Cl.$^6$ .................................................. G02B 6/36
[52] U.S. Cl. .................................................. 385/89
[58] Field of Search ................................ 385/15, 17, 78, 385/88, 92

[56] References Cited

U.S. PATENT DOCUMENTS

| | | | |
|---|---|---|---|
| 4,909,590 | 3/1990 | Kamiko et al. | 385/88 |
| 4,973,127 | 11/1990 | Cannon, Jr. et al. | 385/88 |
| 5,048,917 | 9/1991 | Komatsu | 385/78 |
| 5,155,784 | 10/1992 | Knott | 385/88 |
| 5,155,786 | 10/1992 | Ecker et al. | 385/94 |
| 5,168,537 | 12/1992 | Rajasekharan et al. | 385/89 |
| 5,212,754 | 5/1993 | Basavanhally | 385/90 |
| 5,249,245 | 9/1993 | Lebby et al. | 385/89 |
| 5,337,391 | 8/1994 | Lebby | 385/88 |
| 5,337,398 | 8/1994 | Benzoni et al. | 385/90 |

FOREIGN PATENT DOCUMENTS

| | | |
|---|---|---|
| 0442312 | 1/1991 | European Pat. Off. . |
| 9200538 | 1/1992 | WIPO . |

OTHER PUBLICATIONS

"Optical Parallel Interconnection Characteristics of 4–Channel 2BGIT/S Bit Synchronous Data Transmission Module: Proceedings of the Electronic Componenets and Technology Conference (ECTC)," San Diego, May 18–20, 1992, No. Conf. May 18, 1992 Institute of Electrical and Electronics Engineers, pp. 77–82.

*Primary Examiner*—Akm E. Ullah
*Attorney, Agent, or Firm*—Irell & Manella LLP

[57] ABSTRACT

An optical interconnect is disclosed that couples multiple optical fibers to an array of optoelectronic devices. The interconnect includes a multiple optical fiber connector and an optoelectronic board. The multiple fiber connector can be mechanically attached to or detached from the board.

43 Claims, 7 Drawing Sheets

PARALLEL OPTICAL INTERCONNECT

This is a continuation of application Ser. No. 08/392,251 filed 2/22/95 now abandoned which is a divisional of 08/066,757 filed 5/24/93 now U.S. Pat. No. 5,420,954.

FIELD OF THE INVENTION

This invention relates to optical interconnects and, more particularly, to optical interconnects that couple multiple optical fibers to arrays of integrally formed optoelectronic devices.

BACKGROUND OF THE INVENTION

Optical fiber technology has been widely utilized in today's telecommunication network. It is also the foundation of a future generation of telecommunication technology which is predicted to revolutionize the way people exchange or obtain information.

One important aspect of optical fiber technology is the interconnection of optical fibers to optoelectronic devices such as semiconductor lasers, photo-detectors, etc, wherein the optoelectronic devices either receive optical radiation from the optical fibers or the optoelectronic devices emit optical radiation into the fibers. A good optical interconnect between an optical fiber and an optoelectronic device requires high coupling efficiency (i.e. low loss of light from the coupling), ease of making the coupling, and low cost for making such an interconnect.

The conventional method for coupling an optical fiber to an optoelectronic device is by active alignment. For example, to couple a semiconductor laser to an optical fiber by active alignment, the laser is first turned on to emit optical radiation. A coupling end of the optical fiber is then placed near a light emitting surface of the laser to receive optical radiation, and a photodetector is placed at the other end of the fiber to detect the amount of optical radiation that is coupled into the fiber. The position of the coupling end of the fiber is then manipulated manually around the light-emitting surface of laser until the photodetector at the other end of the fiber detects maximum optical radiation. Optical epoxy is then applied to both the laser and the coupling end of the fiber so as to permanently maintain the optimized coupling.

A photo-detector can be similarly coupled to an optical fiber by shining laser light into one end of the fiber and manually adjusting the position of the other end of the fiber that is to be coupled to the detector until the detector's electrical response to the optical radiation reaches a maximum. Optical epoxy is then applied to attach the fiber to the detector.

Because the dimensions of the light-emitting surface of a semiconductor laser and the cross-section of an optical fiber are very small, e.g. on the order of 10 µm for single mode fiber, coupling a semiconductor laser to an optical fiber is a task that is usually time-consuming and requires expertise and experience. As for coupling an optical fiber to a photo-detector, even though one may increase the size of the detector to make such coupling easier, increasing the detector size undesirably increases the parasitics of the detector and thus compromises the detector's operating speed and frequency response.

One problem of the above-described optical interconnect is that the alignment between the fiber and the optoelectronic device may suffer misalignment under thermal strain. Such thermal strain occurs when the temperature of the interconnect increases due to the heat generated by the optoelectronic device, the circuits for driving the device, or by various other factors such as the nearby electronic componenets.

It is also not practical to apply the above-described method of active alignment to couple multiple optical fibers to an array of optoelectronic devices that are monolithically formed on a semiconductor chip because the array normally contains a large number of devices that are closely spaced. However, it would be very useful to couple such an array of photo-emitters to such an array of photo-detectors via multiple optical fibers in applications such as local area networks (LANs) which require the coupling of signals in parallel.

It is therefore an object of this invention to provide optical interconnects that mechanically couple multiple optical fibers to arrays of integrally formed optoelectronic devices.

SUMMARY OF THE INVENTION

The present invention is an optical interconnect for coupling multiple optical fibers to an optoelectronic device array.

In a first embodiment of the invention, the optical interconnect comprises a multiple optical fiber connector coupled with an optoelectronic board.

The multiple fiber connector comprises a holder having at least one planar surface, a plurality of optical fibers attached to the holder, each fiber having a coupling end abutting the first surface so as to expose the coupling end for receiving or transmitting optical radiation, the first ends of the fibers forming a fiber array, and guiding means disposed in the holder at predetermined positions with respect to the fiber array.

The optoelectronic board comprises an array of optoelectronic devices that are monolithically formed on a semiconductor chip in substantially the same pattern as the fiber array. The board further comprises aligning means formed on the chip at substantially the same predetermined positions with respect to the array of optoelectronic devices as the guiding means are positioned relative to the fiber array.

The fiber connector is coupled to the optoelectronic board by aligning and engaging the guiding means into the aligning means, whereby the optoelectronic device array is aligned with the optical fiber array, and whereby each optoelectronic device is coupled to an optical fiber. Preferably, the guiding means are guiding pins and the aligning means are aligning holes formed in the chip.

The optoelectronic devices may be photo-emitters which emit optical radiation into the fiber array or photo-detectors which receive optical radiation transmitted from the fiber array.

In a second embodiment, the optical interconnect comprises a multiple optical fiber connector and an optoelectronic board. The fiber connector is the same as that of the first embodiment.

The optoelectronic board comprises a substrate having a first surface and first aligning means, a semiconductor chip mounted on the first surface of the substrate, and an array of optoelectronic devices monolithically formed on the chip. The optoelectronic devices are arranged on the chip in substantially the same pattern as the fiber array. The optoelectronic board further comprises a second aligning means for aligning the optoelectronic device array to the first aligning means. The first aligning means are disposed at substantially the same predetermined positions with respect to the optoelectronic device array as the guiding means are positioned relative to the fiber array.

The connector is coupled to the optoelectronic board by aligning and engaging the guiding means into the aligning means, whereby the optoelectronic device array is aligned with the optical fiber array, and whereby each optoelectronic device is coupled to a fiber. Preferably, the guiding means are guiding pins and the aligning means are aligning holes formed in the substrate. Again, the optoelectronic devices may be photo-emitters or photo-detectors.

This invention reduces misalignment due to thermal strain caused by thermal expansion mismatch between the different materials that are used in the interconnect. This is achieved by anchoring the optical fiber assembly to the locations of the guiding pins.

In a third embodiment of the invention, an optical interconnect comprises an optical fiber and a vertical cavity surface emitting laser (VCSEL) coupled to a coupling end of the fiber.

The optical fiber comprises a core and a cladding layer surrounding said core. The core at the coupling end of the fiber is recessed so as to form a rimmed structure, wherein the rim comprises substantially the cladding layer.

The VCSEL comprises a semiconductor substrate, a first mirror formed on said substrate, a second mirror parallel to and disposed above the first mirror and forming with said first mirror an optical cavity that is perpendicular to the substrate, and an active region surrounded by first and second spacers disposed between said mirrors.

The first and second mirrors are distributed Bragg reflectors comprising a plurality of layers formed one on top of the other. The uppermost layers of said second mirror form a mesa having a diameter less than the inner diameter of the rim. The mesa engages said rimmed structure so as to place a substantial portion of said mesa inside the rim. As a result, the laser is self-aligned and the optical radiation emitted from the laser is substantially coupled into said optical fiber.

This interconnect reduces the misalignment due to thermal strain because the laser is embedded in the optical fiber.

BRIEF DESCRIPTION OF THE DRAWINGS

These and other objects, features and advantages of the invention will be more apparent from the following detailed description in conjunction with the appended drawings in which:

FIG. 1b depicts a view of surface 130 of FIG. 1a;

DETAILED DESCRIPTION

In accordance with the invention, a first embodiment of the optical interconnect of the present invention comprises a multiple optical fiber connector and an optoelectronic board. The connector comprises a holder, a plurality of optical fibers attached to the holder, and guiding means. The optoelectronic board comprises an optoelectronic device array that is monolithically formed on a semiconductor chip and aligning means defined on the chip. The optical fibers are coupled to the optoelectronic device array by mechanically engaging the connector's guiding means to the aligning means of the board.

Figure 1A:
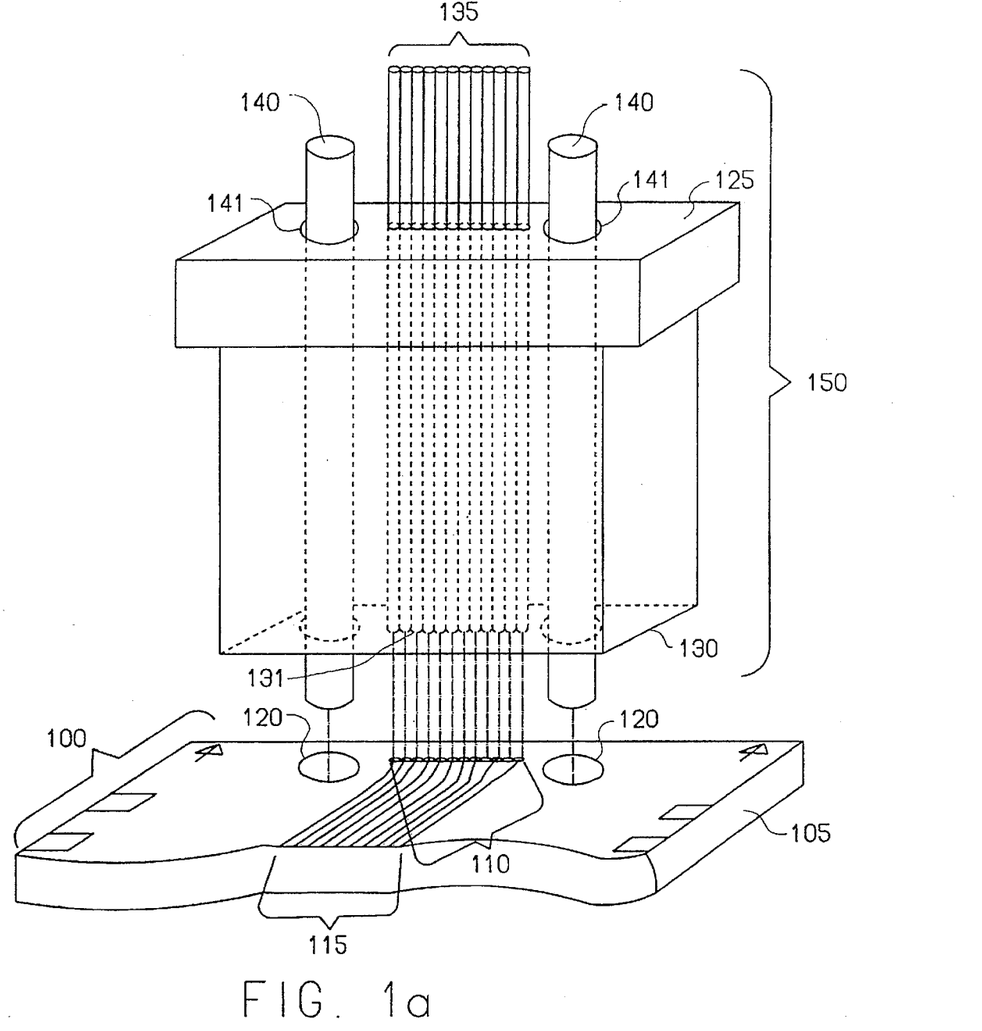
FIG. 1a illustrates a three-dimensional view of a first embodiment of the optical interconnect of the present invention.

FIG. 1a illustrates a preferred embodiment of the optical interconnect. The preferred embodiment comprises an optical fiber connector 150 and an optoelectronic board 100.

Optical fiber connector 150 comprises a holder 125 having a planar surface 130, a plurality of optical fibers 135 embedded in the holder, and two guiding pins 140 slideably mounted in two cylindrical tunnels 141.

Figure 1B:
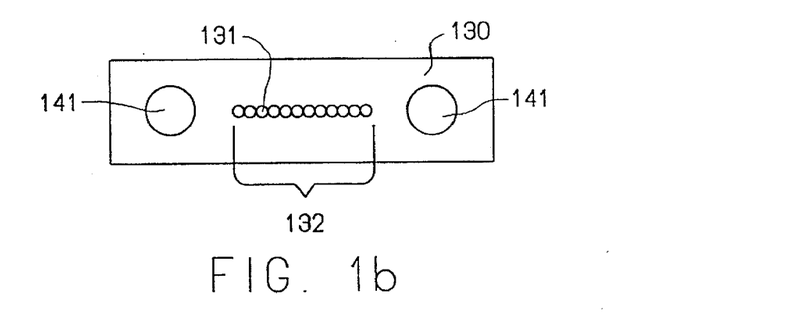

The fibers have coupling ends 131 that vertically abut surface 130. The coupling ends of the fiber are exposed so as to receive or emit optical radiation. As depicted in the end view of surface 130 in FIG. 1b, coupling ends 131 form a one-dimensional optical fiber array 132. The distance between any two fibers in the array is equal to that of any other two adjacent fibers. Preferably, the distance between centers of any two adjacent fibers is about 0.25 mm.

Tunnels 141 and pins 140 are positioned symmetrically with respect to the fiber array. The positions of the tunnels and pins with respect to the fiber array are predetermined.

Optoelectronic board 100 comprises a semiconductor chip 105, a one-dimensional optoelectronic device array 110 monolithically formed on the semiconductor chip, and a plurality of conducting lines 115 for contacting the optoelectronic devices. The chip contains two aligning holes 120 having approximately the same diameter as tunnel 141 for receiving the guiding pins. Advantageously, array 110 and aligning holes 120 of the board have substantially the same pattern as that formed by optical fiber array 132 and tunnels 141 of the fiber connector, i.e., the distance between the centers of any two adjacent optoelectronic devices are the same as the distance between the centers of any two adjacent fibers. Thus, by simply engaging the guiding pins 140 in the tunnels of the fiber connector to the aligning holes 120 on the optoelectronic board, the optical fiber array is axially aligned to the optoelectronic device array. Each optical fiber is also aligned to a corresponding optoelectronic device.

Optical connectors similar to the one shown in FIG. 1a have been disclosed by Hayashi, et al in European Patent Application publication No. 0,226,274 which is incorporated herein by reference. The same type of optical connectors are commercially available with a tolerance on the order of 10 μm between the centers of two adjacent fibers.

The optoelectronic device array and the aligning holes on the semiconductor chip are defined by well developed semiconductor processing technologies such as photolithography and chemical or reactive ion etching. Consequently, the tolerance of the device features or the aligning holes can be controlled to within the order of 10 μm. Combining this tolerance with the tight tolerance of the available fiber connector, this interconnect provides good coupling efficiency. It can also be easily connected or disconnected.

The optical fibers may be single mode fibers or multimode fibers, e.g. plastic fibers. Preferably, the optical fibers are multi-mode fibers having a core diameter ranging from 50 to 100 μm. Multiple mode optical fibers normally have greater core diameters than single mode optical fibers; and as a result they offer higher alignment tolerance than single mode fibers.

The optoelectronic devices may be various types of devices such as edge-emitting lasers, Super Luminescence Diodes (SLEDs), Vertical Cavity Surface Emitting Lasers (VCSELs), other surface emitting devices or photo-detectors. They may also be integrated devices combining one or more devices such as the combination of VCSELs and transistors, or photo-detectors and transistors.

When the optoelectronic devices are VCSELs, the optical interconnect functions as a transmitter sending optical signals into the optical fibers. Generally, the tolerance of alignment in this interconnect is in the range of 2–20 μm. For example, each VCSEL has a diameter of approximately 20 μm and each fiber is a multi-mode fiber having a core diameter of about 62.5 μm, the alignment tolerance is about 10 μm.

The optical interconnect may further comprise electronic circuit means interconnected to the VCSEL array for driving and modulating the VCSELs. Such electronic circuit means may be monolithically formed on the semiconductor chip, or integrated with the VCSEL array as a hybrid integrated circuit.

If the optoelectronic devices are photo-detectors formed on the semiconductor chip, the optical interconnect functions as a receiver for receiving optical signals from the optical fibers. For example, if each photo-detector is a Schottky-barrier photo-detector having a diameter of approximately 100 μm, and each fiber is a multi-mode fiber having a core diameter of about 62.5 μm, the alignment tolerance between the fibers and the detectors is about 20 μm.

In the above-described preferred embodiment, one-dimensional arrays are used as an example. However, two-dimensional arrays can also be similarly utilized to form a two-dimensional optical interconnects.

In the second embodiment of the present invention, the optical interconnect also comprises an optical connector and an optoelectronic board. The connector comprises a holder, a plurality of optical fibers attached to the holder, and guiding means. The optoelectronic board comprises a substrate, a semiconductor chip disposed on the substrate, and an optoelectronic device array monolithically formed on the semiconductor chip. The optoelectronic board further comprises first aligning means formed in the substrate, and second aligning means disposed between the chip and the substrate so as to properly position the optoelectronic device array with respect to the first aligning means. By mechanically aligning and engaging the guiding means of the connector to the first aligning means of the board, the optical fibers are coupled to the optoelectronic device array.

Figure 2A:
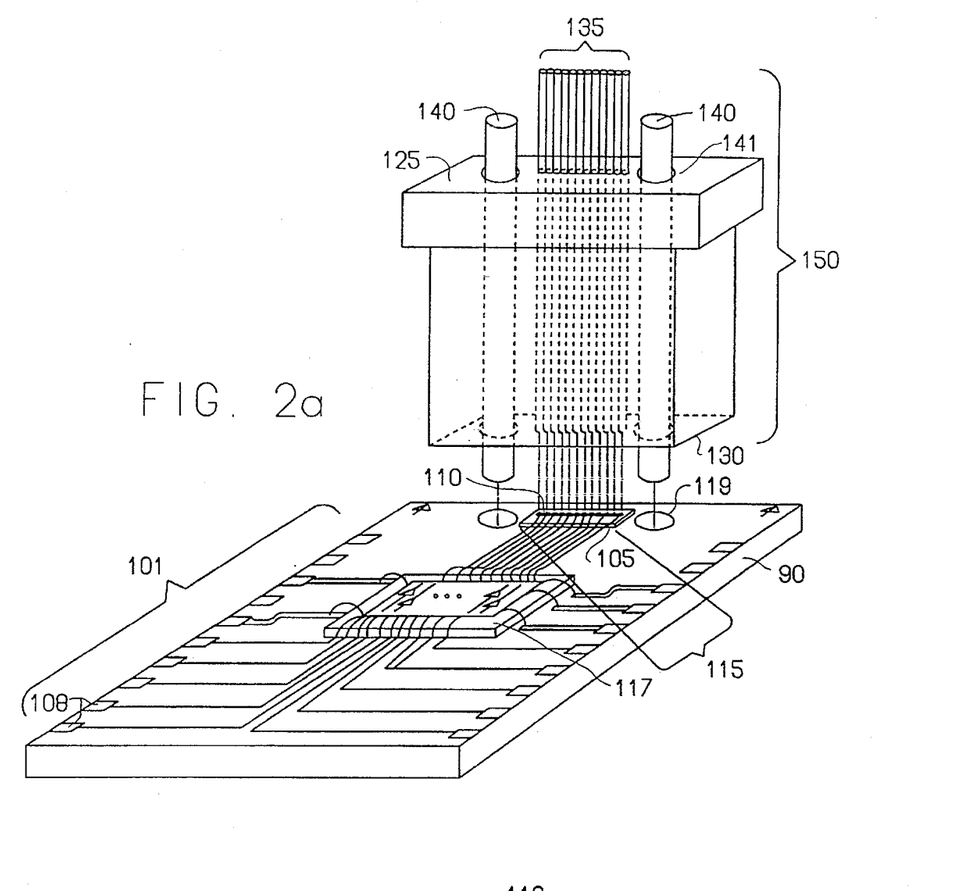
FIGS. 2a–b depicts a second embodiment of the invention.
Figure 2B:
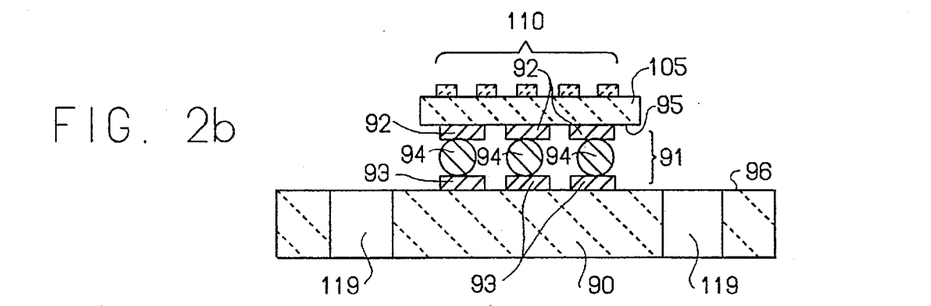

FIG. 2a depicts the preferred embodiment of the optical interconnect which comprises an optical connector 150 and an optoelectronic board 101. For convenience, like elements in FIGS. 2a–b are designated with the same numbers as in FIG. 1. Optical fiber connector 150 in this embodiment is the same as the optical connector in the first embodiment, and is therefore not discussed in detail here.

Optoelectronic board 101 comprises a dielectric substrate 90, a semiconductor chip 105 disposed on the substrate, a linear optoelectronic device array 110 monolithically formed on the semiconductor chip, electronic circuit means 117 interconnected to the optoelectronic device array, and contact pads 108 defined at the periphery of the substrate for making contact to the circuit means. The optoelectronic board further includes two aligning holes 119 formed in the substrate as first aligning means for receiving the guiding pins. As depicted in FIG. 2b, the board further comprises second aligning means 91 formed between a second surface 95 of the semiconductor chip and a first surface 96 of the substrate. The second alignment means laterally aligns the optoelectronic device array to first aligning means 119 that is formed in the substrate.

The principle of forming this optical interconnect is as follows:

The optoelectronic devices are first formed on the semiconductor chip. They are arranged to form an array having the same pattern as the optical fiber array. Utilizing the well developed semiconductor technology, the positions of the optoelectronic devices can be precisely defined such that the distance between centers of any two adjacent devices are the same as the distance between centers of any two adjacent fibers.

Next, aligning holes 119 in the substrate are defined by using techniques such as precision laser drilling. The aligning holes have substantially the same diameters as tunnels 141 of the optical fiber connecter and the distance between the centers of the two aligning holes is substantially the same as that between the tunnels. Thus, guiding pins can be aligned to the aligning holes.

The optoelectronic device array is then laterally aligned to the aligning holes by utilizing the flip-chip bonding technology. As illustrated in FIG. 2b, the flip-chip bonding technology mainly comprises the steps of forming a first set of metal pads 93 on first surface 96 of the substrate, the patterns having predetermined positions with respect to aligning holes 119; this is followed by depositing a layer of solder on the substrate. The solder layer is then patterned by photolithography and etching to form a second set of solder patterns 94 on top of the first set of metal patterns. A third set of metal pads 92 that is the mirror image of the first set is then defined on second surface 95 of the semiconductor chip. By utilizing infrared alignment techniques, the third set of patterns is aligned with the optoelectronic device array in such a way that, if the third set is vertically aligned with the first set, the optoelectronic device array will laterally align to the aligning holes in a way such that the optoelectronic device array will also be vertically aligned to the optical fiber array.

Advantageously, the third set of patterns is aligned to the first set by a self-alignment process. In the self-alignment process, the third set is first coarsely aligned with the second set. Then, heat is applied to melt the solder. The melted solder is confined between the third and first metal patterns and does not flow laterally beyond the patterns. Due to the surface tension of the solder, the third set of patterns is automatically aligned to the first set of patterns. When the heat is removed, the solder cools down and the self-alignment process is completed. This flip-chip technology is explained in detail by Wale et al, "Flip-Chip Bonding Optimize Opto-Ics", *IEEE Circuit and Devices*, pp.25–31, Nov. 1992, which is incorporated herein by reference.

Consequently, at the completion of the solder flow self-alignment process, the optoelectronic device array is laterally aligned to the aligning holes in the same way as the fiber array is aligned to the guiding pins. Thus, by vertically aligning and engaging the guiding pins with the aligning holes, the fiber array is aligned with and coupled to the optoelectronic device array.

As in the case of the optical interconnect of FIG. 1a, if the optoelectronic devices are VCSELs and electronic circuit means 117 are integrated circuits for driving and modulating the VCSELs, the interconnect functions as an optical transmitter that injects optical signals into the fibers. If the optoelectronic devices are photo-detectors, the interconnect functions as an optical receiver that receives optical signals transmitted through the optical fibers. The photo-detectors send electrical signals that correspond to the optical signals to the electronic circuit means which process the signals before forwarding them to other circuits such as computers or processors. If the optoelectronic devices comprise both VCSELs and photo-detectors, this optical interconnect is effectively both a transmitter and a receiver.

Note that by using the solder flow self-aligning process, two or more individual semiconductor chips may be aligned to one optical fiber array. In this case, the devices on one chip are coupled to some optical fibers of the fiber connector, whereas the devices on the other wafer(s) are coupled to the other optical fibers. In this way, a transmitter and a receiver may be coupled to a single optical connector.

Figure 3:
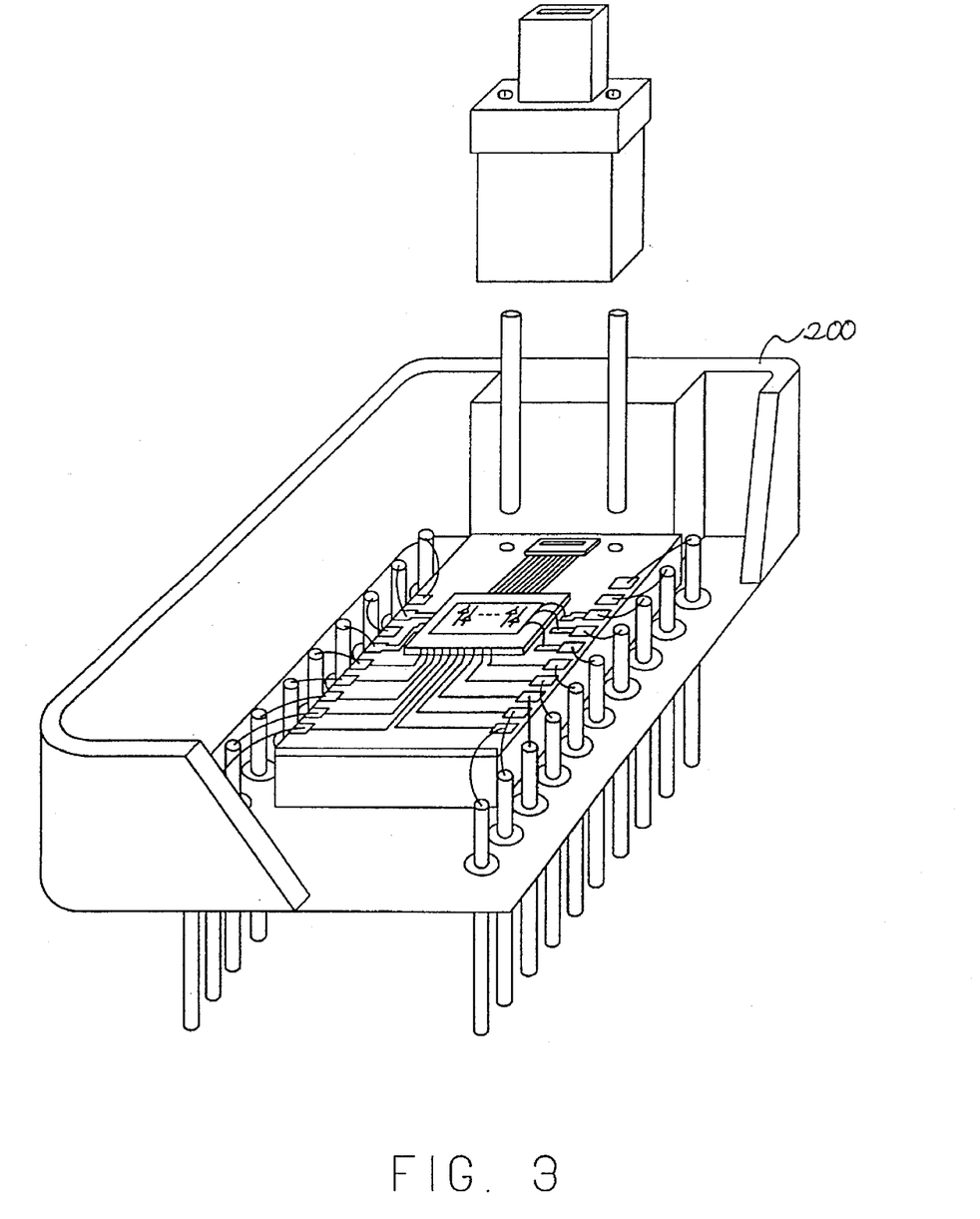
FIG. 3 illustrates the packaged interconnect of FIG. 2.

FIG. 3 illustrates the optical interconnect of FIG. 2 as mounted in a twenty-pin package 200. The fiber connector can be easily attached to or detached from the optoelectronic board.

Figure 4A:
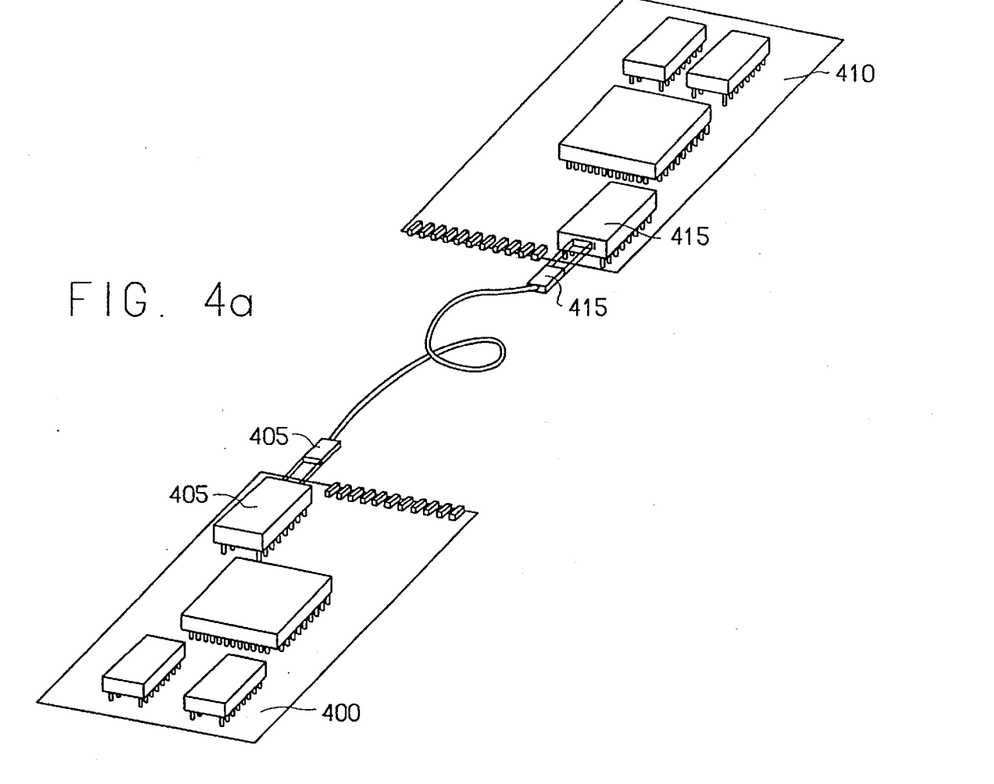
FIGS. 4a–b illustrate an application of the optical interconnects of the present invention.
Figure 4B:
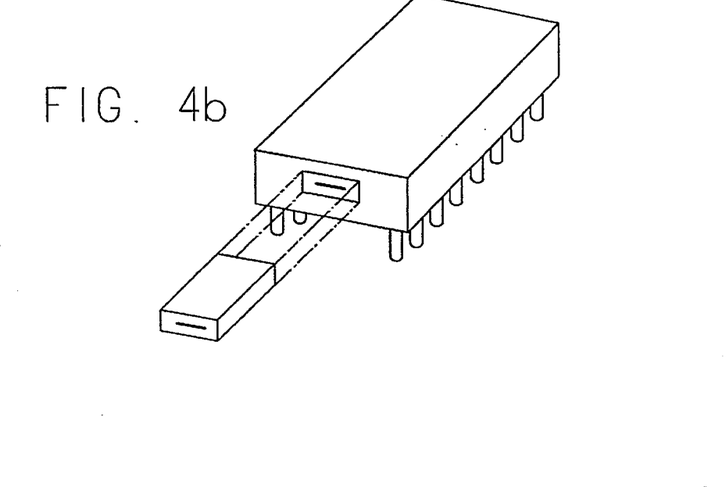

FIG. 4a illustrates the use of the optical interconnect of the present invention for board-to-board interconnect. In this application, board 400 is connected to board 410 via connectors 405 and 415. FIG. 4b is an enlarged illustration of connector 405 or 415. Each of 405 or 415 comprises an optical interconnect such as the one depicted in FIG. 1a or FIG. 3. If connector 405 contains only the optical interconnect that is a transmitter and connector 415 contains only the optical interconnect that is a receiver, then data are transmitted only from board 400 to board 410. However, if both connector 405 and 415 include optical interconnects that have both a transmitter and a receiver, then data can be transmitted in full duplex fashion between the boards via an optical fiber ribbon.

In a third embodiment of invention, an optical interconnect comprises an optical fiber having a coupling end and a vertical cavity surface emitting laser coupled to the coupling end of the fiber.

The optical fiber comprises a core and a cladding layer surrounding the core. The core at the coupling end is recessed so as to form a rimmed structure wherein the rim comprises the cladding layer.

The VCSEL has a second mirror that is a distributed Bragg reflector comprising a plurality of layers formed one on top of the other. Advantageously, the outermost layers of the second mirror form a mesa that has a diameter smaller than the inner diameter of the rim. The mesa engages the coupling end so as to place a substantial portion of the mesa inside the rim. The VCSEL emits optical radiation that is substantially coupled into the optical fiber.

Figure 5A:
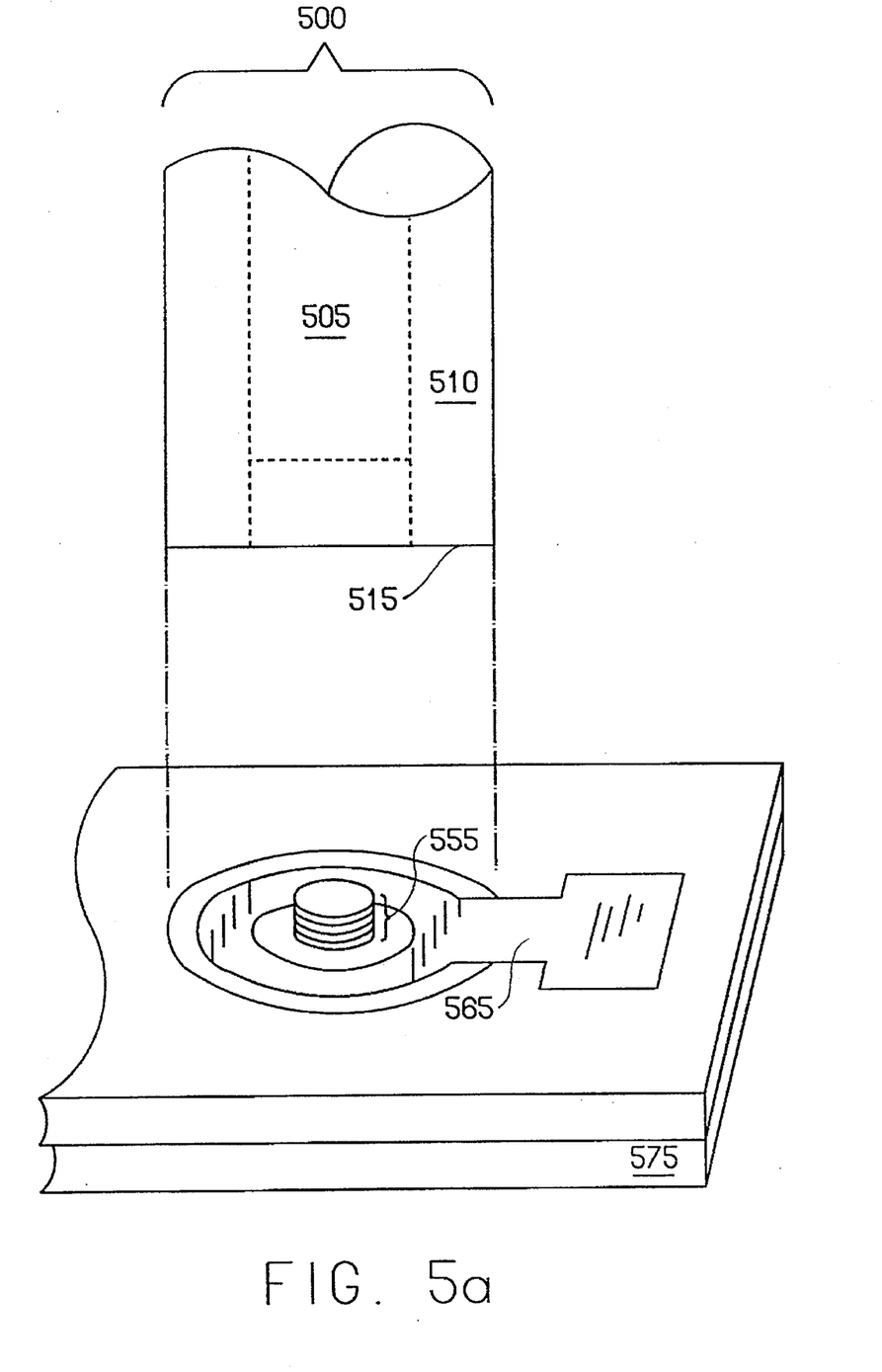
FIGS. 5a–c depict a third embodiment of the optical interconnect of this invention.
Figure 5B:
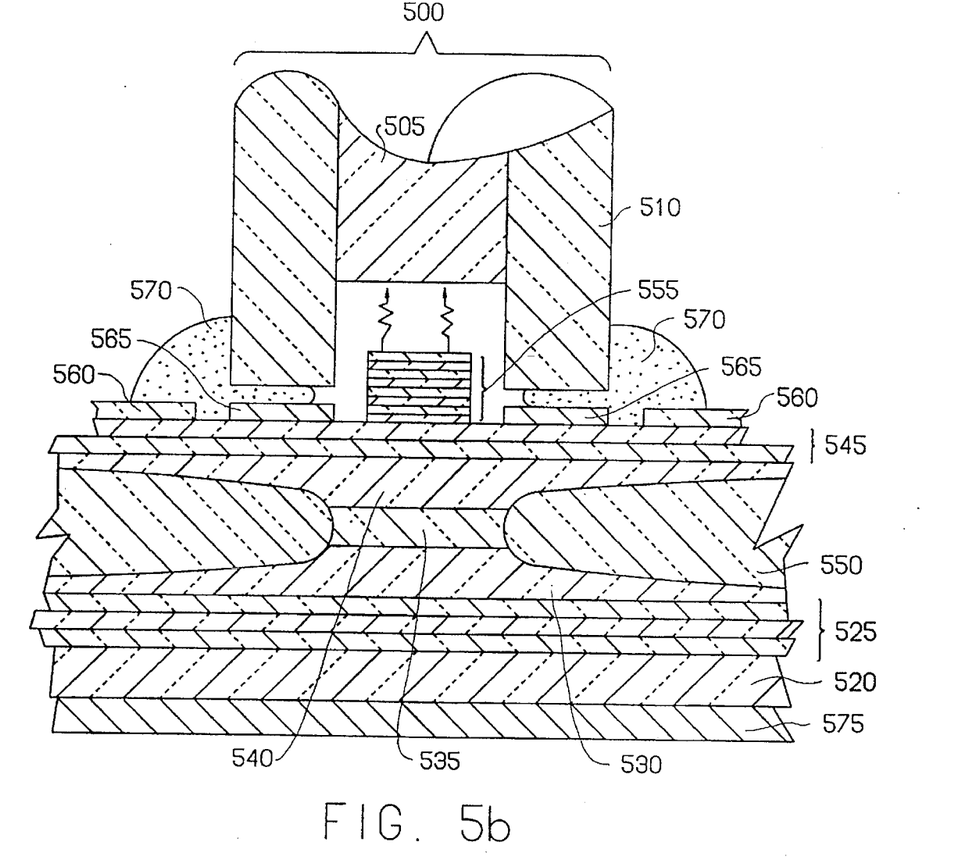
Figure 5C:
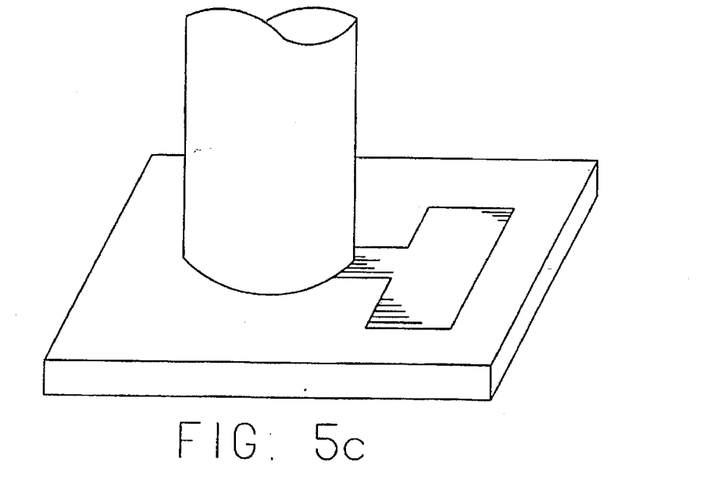

FIGS. 5a-c illustrate a preferred embodiment of the invention.

Specifically, FIG. 5a depicts a three-dimensional view of an optical fiber 500 and a VCSEL prior to their coupling. Fiber 500 comprises a core 505 and a cladding layer 510 surrounding the core. At a coupling end 515 of the fiber, the core is recessed so as to form a rim 516 that is mainly made of the cladding layer. The VCSEL includes a mesa 555 that comprises the outermost layers of a second mirror, several underlying layers described in FIG. 5b, and a contact 565 that surrounds the mesa.

FIG. 5b illustrates a cross-section view of the optical interconnect. The VCSEL comprises a first mirror 525 formed on substrate 520, a first spacer 530, an active region 535, a second spacer 540, a portion of a second mirror 545, and the mesa portion of the second mirror 555. The VCSEL further comprises contact 565 surrounding the mesa and contact 575 formed on the substrate. Additionally, there is a passivation layer 560 that protects most of the surface from the atmosphere. Preferably, the passivation layer is a $SiO_2$ layer. The laser further includes an annular implanted current confinement layer 550 that surrounds the active region.

Both the first and second mirrors are distributed Bragg reflectors, each comprising a plurality of layers formed one on top of the other. Additionally, each layer is a quarter-wavelength thick wherein the wavelength is the wavelength in the layer. Preferably, mesa 555 comprises dielectric layers; and layers 545 are semiconductor layers having high doping concentration so as to form low resistance contact with contact 565.

The coupling end of the fiber is firmly fixed to the upper portion of the VCSEL by an optical epoxy 570.

The optical fiber in this interconnect can be a single-mode fiber, a multi-mode fiber, or a plastic fiber.

FIG. 5c depicts the three-dimensional view of such interconnect. In this interconnect, all the optical radiation is substantially coupled into the fiber without requiring additional alignment means.

This interconnect is fabricated as follows: First, the VCSEL as illustrated in FIG. 5b is prepared, followed by the fabrication of the optical fiber with a recessed core at the coupling end. The core and the cladding layer of a glass optical fiber are normally both made of silica. However, the core is usually doped to increase the refractive index and hence it can be selectively etched from the cladding layer by buffered hydrofluoric acid (BHF) or other acid. Next, the etched fiber is aligned to the VCSEL and the mesa of the VCSEL is fitted into the rim. Optical epoxy is then applied to the fiber and laser.

Such an interconnect can also be made in one or two dimensional arrays, wherein an array of integrally formed VCSELs is coupled to an array of optical fibers.

Figure 6A:
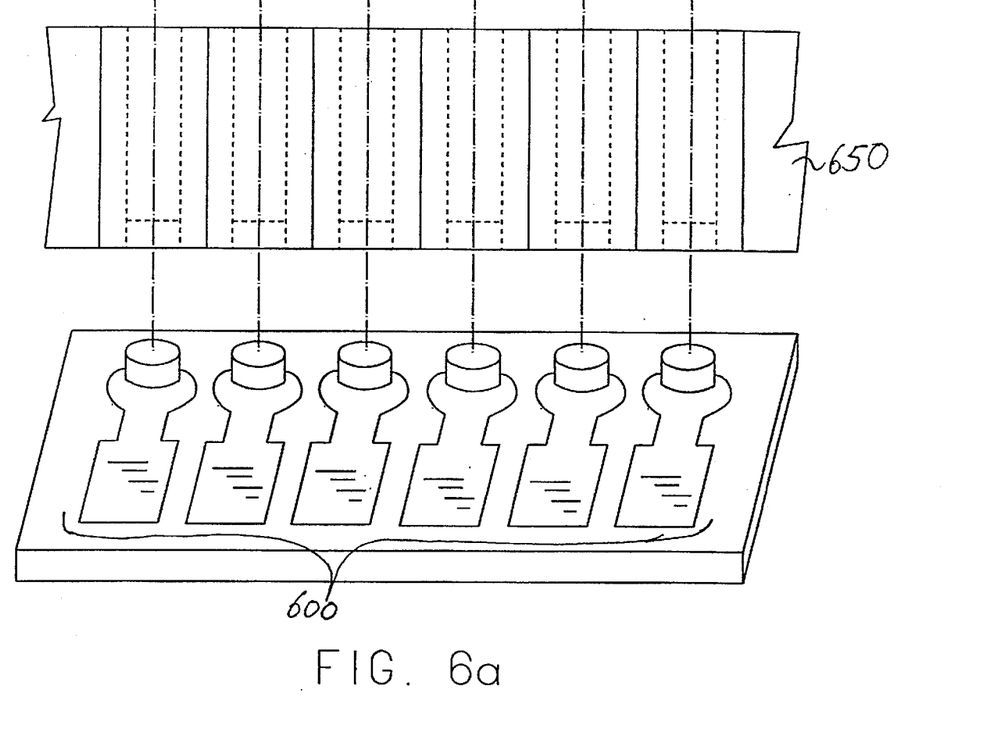
FIGS. 6a–b illustrate an array of optical interconnects of FIGS. 5a–c.
Figure 6B:
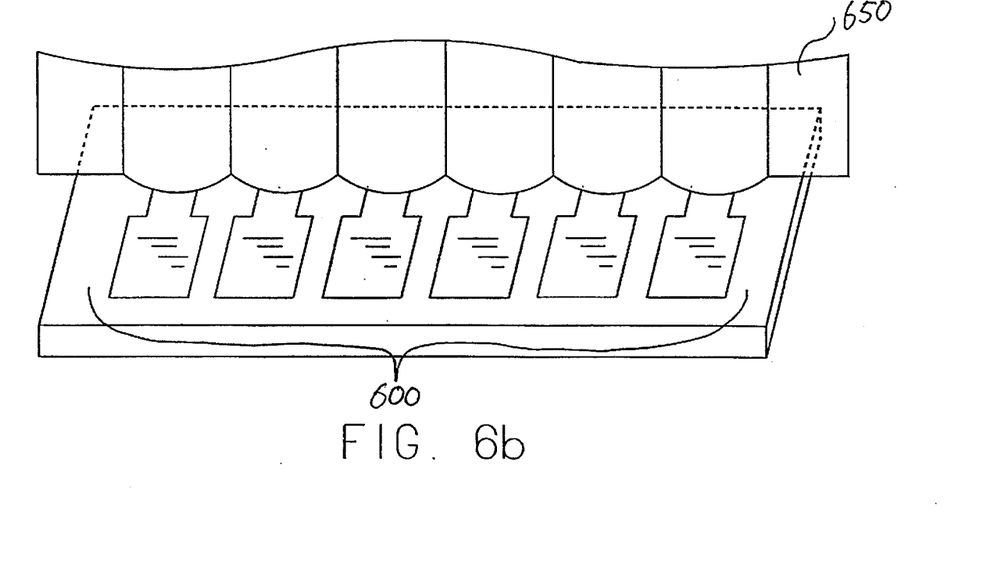

FIGS. 6a–b illustrate an example of such an optical interconnect wherein a fiber connector 650 comprising a linear array of optical fibers is coupled to a linear array of VCSELs. Specifically, FIG. 6a depicts the VCSEL array and the fiber array prior to their coupling, whereas FIG. 6b illustrates the interconnect after their coupling.

In this embodiment, each VCSEL and each optical fiber has the same construction as those described in FIG. 5b, and thus they are not discussed in detail here. Additionally, the fiber connector 650 can be aligned and coupled to the VCSEL array by using a pair of tunnels and guiding pins in the fiber connector and aligning holes adjacent to the VCSEL array as described in the embodiments shown in FIGS. 1–4.

As will be apparent to those skilled in the art, numerous modifications may be made within the scope of the invention, which is not intended to be limited except in accordance with the following claims.

Note that, throughout this specification, optical fibers may be single-mode fibers, multi-mode fibers (e.g. plastic fibers), or other types of optical fibers; an array of optoelectronic devices may be one-dimensional or two dimensional; the optoelectronic devices may edge emitting lasers, super luminescence diodes, VCSELs, photo-detectors or any other type of optoelectronic device. They are all within the scope of this invention.

What is claimed is:

1. An optical interconnect comprising:
   a multiple optical fiber connector comprising:
   a holder having a first planar surface,
   a plurality of optical fibers attached to the holder, each fiber having a first end abutting the first surface so as to expose the first end for receiving or transmitting optical radiation, the first ends of the fibers forming a fiber array having a first pattern, and guiding means disposed in said holder at predetermined positions with respect to the fiber array; and an optoelectronic board comprising:

an optoelectronic device array monolithically formed on a semiconductor chip, said optoelectronic device array having substantially the same pattern as the first pattern of said fiber array, and aligning means formed on said chip, said aligning means being disposed at substantially the same predetermined positions with respect to said array of optoelectronic devices as the positions of the guiding means relative to said fiber array, and said aligning means receiving said guiding means so as to mechanically align said optoelectronic device array with said optical fiber array, whereby each optoelectronic device is aligned to an optical fiber, said optoelectronic device emitting optical radiation into said fiber array or receiving optical radiation from said fiber array.

2. The interconnect of claim 1 wherein said guiding means comprises two guiding pins mounted in the holder, said pins extending through said first planar surface of the holder, and said aligning means comprises two aligning holes, the fiber array being aligned to the optoelectronic device array by aligning and engaging said guiding pins with said aligning holes.

3. The interconnect of claim 2 wherein said fiber array is disposed between the two guiding pins.

4. The interconnect of claim 1 wherein said guiding means comprises two guiding pins mounted in the holder, said pins extending through said first surface of the holder in a direction perpendicular to said first surface, and said aligning means including two aligning holes, said fiber array being aligned to said optoelectronic device array by aligning and engaging said guiding pins with said aligning holes.

5. The interconnect of claim 4 wherein said fiber array are disposed between said two guiding pins.

6. The interconnect of claim 1 wherein the fibers form a one-dimensional array.

7. The interconnect of claim 1 wherein the fibers form a two-dimensional array.

8. The interconnect of claim 6 wherein the optoelectronic device array comprises a one-dimensional array of vertical cavity surface emitting lasers, each laser being axially aligned to a fiber and the fibers receiving optical radiation emitted by the lasers.

9. The interconnect of claim 8 further comprising a first electronic circuit means interconnected to said array of lasers for driving and modulating said lasers.

10. The interconnect of claim 8 wherein each of the optical fibers is a plastic optical fiber.

11. The interconnect of claim 8 wherein each of the optical fibers is a single-mode optical fiber.

12. The interconnect of claim 8 wherein each of the optical fibers is a multi-mode optical fiber.

13. The interconnect of claim 12 wherein each multi-mode optical fiber has a diameter of approximately 62.5 μm.

14. The interconnect of claim 13 wherein each of the vertical cavity surface emitting lasers has a diameter of approximately 20 μm.

15. The interconnect of claim 6 wherein the array of optoelectronic devices comprises an one-dimensional array of photo-detectors, each photo-detector being axially aligned to an end of a fiber, and the detectors receiving optical radiation emitted by the lasers.

16. The interconnect of claim 15 wherein the photo-detectors are Schottky-barrier photo-detectors.

17. The interconnect of claim 15 further comprising a second electronic means for receiving an electronic signal from the photo-detectors.

18. The interconnect of claim 16 wherein each of the optical fibers is a multi-mode optical fiber.

19. The interconnect of claim 18 wherein each multi-mode optical fiber has a diameter of approximately 62.5 μm.

20. The interconnect of claim 19 wherein each photo-detector has a diameter of approximately 100 μm.

21. A method for interconnecting an optical connector to an optoelectronic board comprising the steps of:

providing a multiple optical fiber connector, said connector comprising:

a holder having at least one planar surface, a plurality of optical fibers attached to the holder, each fiber having a first end abutting the first surface so as to expose the first end for receiving or transmitting optical radiation, the first ends of the fibers forming a fiber array having a first pattern, and guiding means disposed in said holder at predetermined positions with respect to the fiber array;

providing an optoelectronic board, said board comprising:

an array of optoelectronic devices monolithically formed on a semiconductor chip, said optoelectronic devices having substantially the same pattern as the first pattern of said fiber array, and aligning means formed on the chip, said aligning means being disposed at substantially the same predetermined positions with respect to said array of optoelectronic devices as the position of the guiding means relative to said fiber array; and aligning and engaging said guiding means of said connector with said aligning means of said board so as to mechanically align said array of optoelectronic devices with said array of the optical fiber, whereby each optoelectronic device is aligned to an end of the fiber, said array of optoelectronic devices emitting optical radiation into said fiber array or receiving optical radiation from the fiber array.

22. An optical interconnect comprising:

an optical fiber having a coupling end, said optical fiber comprising a core and a cladding layer surrounding said core, said core at the coupling end being recessed so as to form a structure having a rim, the rim comprising substantially the cladding layer; and a vertical cavity surface emitting laser comprising:

a semiconductor substrate, a first mirror formed on said substrate, and a second mirror disposed above and parallel to the first mirror and forming with said first mirror an optical cavity that is perpendicular to the substrate, the first and second mirrors being distributed Bragg reflectors comprising a plurality of layers formed one on top of the other, and an active region surrounded by first and second spacers disposed between said mirror, the uppermost layers of said second mirror forming a mesa having a diameter less than an inner diameter of the rim, said mesa engaging said rimmed structure so as to place a substantial portion of said mesa inside the rim, and said laser emitting optical radiation that is substantially coupled into said optical fiber.

23. The interconnect of claim 22 further comprising holding means for maintaining the relative positions between the coupling end of said optical fiber and said laser.

24. The interconnect of claim 23 wherein said holding means comprises epoxy applied to the exterior of the coupling end and the laser.

25. The interconnect of claim 22 wherein said laser further comprises a contact surrounding the mesa and formed on the layers of said second mirror that is close to the active region.

26. The interconnect of claim 22 wherein said fiber is a single mode fiber.

27. The interconnect of claim 22 wherein said fiber is a multi-mode fiber.

28. The interconnect of claim 22 wherein said mesa has a thickness of 1 to 3 µm.

29. The interconnect of claim 22 wherein said laser further comprises an annular implanted current confinement region surrounding the active region.

30. A parallel optical interconnect comprising:

an optical connector comprising:

a holder having a first planar surface, a plurality of optical fibers attached to said holder, each fiber having a coupling end abutting the first surface so as to expose the coupling end for receiving or transmitting optical radiation, each said optical fiber comprising a core and a cladding layer surrounding said core, said core at the coupling end being recessed so as to form a structure having a rim, the rim comprising substantially the cladding layer, said coupling end of the fibers forming a fiber array having a first pattern; and an array of vertical cavity surface emitting lasers monolithically formed on a semiconductor chip, said array having substantially the same pattern as said fiber array, and each laser comprising:

a first mirror formed on said chip, and a second mirror disposed above and parallel to the first mirror and forming with said first mirror an optical cavity that is perpendicular to the chip, the first and second mirrors being distributed Bragg reflectors comprising a plurality of layers formed one on top of the other, and an active region surrounded by first and second spacers disposed between said mirror, the uppermost layers of said second mirror forming a mesa having a diameter less than an inner diameter of the rim, each mesa being aligned to and engaging an optical fiber so as to place a substantial portion of said mesa inside the rim of a fiber, and each laser emitting optical radiation that is substantially coupled into an optical fiber.

31. The interconnect of claim 30 further comprising holding means for maintaining the relative positions between the coupling ends of said fiber array and said lasers.

32. The interconnect of claim 31 wherein said holding means comprises epoxy applied to the exterior of the coupling ends and the lasers.

33. The interconnect of claim 31 wherein each laser further comprises a contact surrounding the mesa and formed on the layers of said second mirror that is close to the active region.

34. The interconnect of claim 31 wherein each fiber is a single mode fiber.

35. The interconnect of claim 31 wherein each fiber is a multi-mode fiber.

36. The interconnect of claim 31 wherein each mesa has a thickness of 1 to 3 µm.

37. The interconnect of claim 31 wherein each laser further comprises an annular implanted current confinement region surrounding the active region.

38. The interconnect of claim 31 further comprising guiding means disposed in said holder, and aligning means formed on said chip, said aligning means receiving said guiding means so as to mechanically align said array of lasers to said fiber array.

39. The interconnect of claim 38 wherein said guiding means comprises two guiding pins mounted in the holder, said pins extending through said first surface of the holder, and said aligning means including two aligning holes in said chip, the fiber array being aligned to the array of lasers by aligning and engaging said guiding pins with said aligning holes.

40. The interconnect of claim 31 wherein said fiber array and said array of lasers are two-dimensional arrays having substantially the same pattern.

41. The interconnect of claim 31 wherein said fiber array and said array of lasers are one-dimensional arrays having substantially the same pattern.

42. The interconnect of claim 6 wherein the optoelectronic device array comprises a one-dimensional array of super luminescence diodes, each diode being axially aligned to a fiber and the fibers receiving optical radiation emitted by the diodes.

43. The interconnect of claim 33 wherein each laser further comprises a substrate contact disposed below the substrate.

* * * * *